(12) United States Patent
Foppa Pederetti

(10) Patent No.: US 10,816,956 B2
(45) Date of Patent: Oct. 27, 2020

(54) METHOD OF MAKING A COUNTER-DIE CUTTER, ADAPTING UNIT FOR A MILLING MACHINE AND MILLING MACHINE COMPRISING THIS UNIT

(71) Applicant: PRO FORM S.R.L., Caravaggio (BG) (IT)

(72) Inventor: Franco Foppa Pederetti, Caravaggio (IT)

(73) Assignee: PRO FORM S.R.L., Caravaggio (BG) (IT)

( * ) Notice: Subject to any disclaimer, the term of this patent is extended or adjusted under 35 U.S.C. 154(b) by 108 days.

(21) Appl. No.: 16/302,884

(22) PCT Filed: Mar. 30, 2017

(86) PCT No.: PCT/IB2017/051815
§ 371 (c)(1),
(2) Date: Nov. 19, 2018

(87) PCT Pub. No.: WO2017/203373
PCT Pub. Date: Nov. 30, 2017

(65) Prior Publication Data
US 2019/0294145 A1   Sep. 26, 2019

(30) Foreign Application Priority Data

May 24, 2016 (IT) .............................. 102016053024

(51) Int. Cl.
*G05B 19/4097* (2006.01)
*B26F 1/44* (2006.01)
*B26F 1/40* (2006.01)

(52) U.S. Cl.
CPC ............ *G05B 19/4097* (2013.01); *B26F 1/40* (2013.01); *B26F 1/44* (2013.01);
(Continued)

(58) Field of Classification Search
CPC ...... G05B 19/4097; G05B 2219/35026; B26F 1/44; B26F 1/40; B26F 2001/4463; B26F 2001/4445
See application file for complete search history.

(56) References Cited

U.S. PATENT DOCUMENTS 3,170,342 A   2/1965  Downie
6,189,414 B1 *  2/2001 Yoshizawa ............ B23P 15/406
                                                                76/107.8
(Continued)

FOREIGN PATENT DOCUMENTS

EP        2036659 A1    3/2009

*Primary Examiner* — Charles R Kasenge
(74) *Attorney, Agent, or Firm* — Volpe Koenig

(57) ABSTRACT

A method of making a counter-die cutter for a die cutting machine having a die cutter and respective counter-die cutter includes: acquiring a digital drawing of a die cutter to be made, which is provided with comparing means; acquiring a digital drawing of a respective counter-die cutter to be made; providing a wooden support of the die cutter; making a plurality of comparing means on the support of the die cutter; making the die cutter; detecting the position and/or orientation of the comparing means of the finished die cutter; comparing the detected position and/or orientation with corresponding position and/or orientation of the comparing means being in the digital drawing of the die cutter; modifying the digital drawing of the counter-die cutter based on the detected differences to adapt the digital drawing to the finished die cutter; and making the counter-die cutter based on the modified digital drawing.

13 Claims, 5 Drawing Sheets

(52) U.S. Cl.
CPC ............ *B26F 2001/4445* (2013.01); *B26F 2001/4463* (2013.01); *G05B 2219/35026* (2013.01)

(56) References Cited

U.S. PATENT DOCUMENTS

| | | | | |
|---|---|---|---|---|
| 8,323,163 | B2* | 12/2012 | Asai | B21D 28/04 29/465 |
| 2007/0163413 | A1 | 7/2007 | Salusbury et al. | |
| 2009/0205190 | A1* | 8/2009 | Asai | B21D 28/04 29/465 |
| 2014/0352509 | A1* | 12/2014 | Schroder | B26F 1/44 83/25 |
| 2015/0209982 | A1* | 7/2015 | Kutsuwada | C08J 5/042 428/57 |
| 2016/0185005 | A1* | 6/2016 | Schroder | B26F 1/44 493/74 |

* cited by examiner

METHOD OF MAKING A COUNTER-DIE CUTTER, ADAPTING UNIT FOR A MILLING MACHINE AND MILLING MACHINE COMPRISING THIS UNIT

FIELD OF THE INVENTION

The present invention is in the field of apparatuses for producing die cut blanks. In particular, the present invention relates to a method of making a counter-die cutter, to an adapting unit for a milling machine adapted for making counter-die cutters and to a milling machine comprising such unit.

STATE OF THE ART

Die cutting is a process known and very popular in several fields of the art, such as paper processing industry and typography. It is used to obtain, through cutting, pieces with predetermined shape, sometimes also very complex, starting from a sheet or band of relatively soft material, such as for example paper, cardboard, rubber, fabric, leather, metal sheet, some types of plastics.

Die cutting machines fundamentally comprise two components adapted to pressure cooperate together to cut die-cut elements from sheets or bands of material: the die cutter and the counter-die cutter. The die cutter is formed by a flat or cylindrical support comprising a plurality of cutting rules (i.e. metal blades) provided with an active cutting edge. The cutting rules are cantileverly housed in special grooves obtained in the support with the cutting edge facing away from the support, and are longitudinally shaped and/or mutually arranged so as to correspond to a desired shape for the die cut blanks. The counter-die cutter is constituted of a flat or cylindrical support intended for abutting against the cutting rules. The die cutting is performed by contacting the die cutter and counter-die cutter one to each other with appropriated pressure, a sheet or band of material to die cut being interposed between them.

In addition to the die cutting itself, the manufacture of die cut blanks often provides further workings intended to provide the die cut blank with specific functional and/or aesthetic features.

One of these, largely used in the paper processing industry field, is the creasing, i.e. the printing of lines, just denoted as creasing lines, on the die cut blank, which are intended to allow and/or facilitate a subsequent accurate folding of die cut blank portions without cracks or ruptures occurring in the material. Apart from the fact that the material is not cut but only deformed, the creasing process is similar to the die cutting process and thus is usually carried out together with the latter, in a single working step.

In order to carry out creasing lines, creasing rules are applied on the die cutter support, similarly to the cutting rules. The creasing rules are provided with an active rounded, not cutting, edge and are less projecting from the support surface with respect to the cutting rules. Therefore, they are metal blades provided with a folding, not cutting, profile. Corresponding creasing channels are arranged on the counter-die cutter, which are suitably sized depending on the sizes of the creasing rules and the type of material to work. The pressure interaction among the creasing rules of the die cutter and the creasing channels of the counter-die cutter during the die cutting causes the creasing lines to be created.

Generally, the support on which the cutting rules are mounted is made up of multilayer wood. The rules are inserted by interference in corresponding seats obtained in the support. The latter are generally obtained through laser cutting techniques. The insertion of the rules in the corresponding seats is usually made manually by an operator, often with the aid of a hammer.

Generally, the counter-die cutter comprises, instead, a metal plate or made of a metal alloy, such as for example steel, against which the cutting rules beat. Such a plate is advantageously machined so as to cooperate with the folding rules of the die cutter, as already mentioned. In other words, on the surface of the counter-die cutter intended to abut against the die cutter, creasing channels, i.e. grooves, are made in correspondence of the respective creasing rules. In addition to aid deeper deformations, the creasing channels facilitate the deformation of the die cut blank to create folding lines. The folding lines allow easily obtaining the folding of the die cut blank along the same lines.

In order to make such grooves on the counter-die cutter, several techniques can be used including the use of creasing matrices or the plate milling.

A further technique suitable to make areas cooperating with the creasing rules is the use of Pertinax matrices.

However, the presently deemed more effective technique is the milling. In fact, it allows obtaining accurate machining, in addition to be resistant to time and wear.

A milled counter-die cutter is however unchangeable meaning that, dealing with material removal from a sheet steel or similar material, subsequent adaptations can not be carried out after its making and, therefore, it is extremely important that the machining fully reflects the die cut cutter which the counter-die cutter has to cooperate with.

The making of a new die cutter and the correspondent counter-die cutter, in the industrial field, provides the development of respective digital drawings, typically CAD drawings, subsequently used by numerical control machines. However, this is not enough to ensure a perfect coupling of the creasing rules of the die cutter with the grooves of the counter-die cutter. In fact, as mentioned above, the die cutter is generally made by a wooden support on which notches are made, in which cutting and creasing rules are then manually inserted. Wood is an intrinsically inhomogeneous and instable material that changes shape and size depending on several parameters, including temperature and moisture of the surrounding air. Furthermore, carrying out cuts for the insertion of the rules, not always ensures optimal results in terms of accuracy due to wood inhomogeneities. Finally, the insertion of the rules in the cuts causes deformations of not completely predictable extent inside wood, due both to its inhomogeneity and the rules being manually inserted by an operator, who can apply different pressures per each insertion.

For these reasons, the finished die cut blank does not completely conform to the originally designed die cutter, i.e. to that being in the digital drawing. Therefore, although the counter-die cutter is faithfully replicated with respect to its digital drawing, at the time of the die cutter coupling with the counter-die cutter, i.e. during the real die cutting, the die cutter creasing rules and the counter-die cutter creasing channels could happen not to match accurately, but interference occurs, with evident severe drawbacks.

In this case, the counter-die cutter has to be discharged, a new counter-die cutter has to be designed, a new digital drawing has to be made and a new plate has to be milled.

This results in problems from the perspective of material costs, but especially of throughput times.

The die cutter should in fact allow to obtain substantially identical cuts having high quality and to manufacture a high number of pieces/hour. Depending on the type of die cutter and the typology of material to die cut, the admittable hourly production ranges from 80/100 sheets/h to 10000/12000 sheets/h.

It is therefore apparent how making creasing channels perfectly interacting with the creasing rules is a critical aspect in the die cutting processes, in particular in the light of the need the die cut blank manufacturers have of reducing the overall working times, while keeping a high-quality level.

Therefore, some counter-die cutter manufacturers suggested the not-resolving solution of using measuring tracers to verify the exact position of the rules for subsequently designing a corresponding counter-die cutter, not-resolving since times needed for tracing a die cutter are absolutely inadmissible in the context of reference.

SUMMARY OF THE INVENTION

Object of the present invention is therefore to provide a method of making a counter-die cutter that allows obtaining counter-die cutters perfectly corresponding to the respective real die cutters, in short times.

A further object of the present invention is to provide a method of making a counter-die cutter, the method being rapid and, at the same time, allowing wasters to be avoided.

Other object of the present invention is to provide an adapting unit applicable to a milling machine, that allows a counter-die cutter milling program based on a theoretical digital drawing to be modified, in order to make it consistent with a real die cutter, in short times.

Further object of the present invention is to provide a milling machine able to work, with good accuracy degree, on the basis of the real drawing of a die cutter, in short times, in order to obtain a counter-die cutter perfectly consistent with the same.

These and further objects are achieved by a method of making a counter-die cutter, an adapting unit for a milling machine and a milling machine that provide a rapid comparison between the ideal die cutter, i.e. the designed and drawn one, and the real die cutter, i.e. the finished one, so as to accordingly modify the drawing of the counter-die cutter and achieve a counter-die cutter perfectly couplable with the real die cutter, in short times.

In particular, the Applicant found that, by detecting on the finished die cutter the position of a discrete number of holes or equivalent comparing means, a corrective factor can be estimated that allows rapidly modifying the digital drawing and thus the corresponding milling program, without the need neither of detecting the coordinates of all the die cutter rules with a measuring tracer nor of carrying out long measurements, and without the need of re-designing a new counter-die cutter.

The first object of the present invention is achieved by a method according to claim 1. In particular, such an object is achieved by a method of making a counter-die cutter for a die cutting machine, comprising a die cutter and a respective counter-die cutter, which method comprises the steps of:

a. acquiring a digital drawing of a die cutter to be made, such die cutter being provided with comparing means;

b. acquiring a digital drawing of a respective counter-die cutter to be made;

c. providing a wooden support of the die cutter;

d. making a plurality of comparing means on the support of the die cutter;

e. making the die cutter;

f. detecting the position and/or orientation of the comparing means of the finished die cutter;

g. comparing the detected position and/or orientation with corresponding position and/or orientation of the comparing means being in the digital drawing of the die cutter;

h. modifying the digital drawing of the counter-die cutter on the basis of the detected differences, so as to adapt the digital drawing to the finished die cutter;

i. making the counter-die cutter on the basis of the modified digital drawing.

Such a method allows obtaining counter-die cutters couplable to the respective real die cutters with high degree of accuracy and in short times. Generally, the detectable differences are smaller than 15 tenths of millimeter per each die cutter linear meter.

It allows therefore wasters to be avoided and, at the same time, long manufacturing processes.

In presence of an already finished die cutter provided with suitable comparing means, the object of the invention is achieved by the same method freed from steps (c), (d) and (e).

Preferably the step (d) of making a plurality of comparing means on the die cutter support, comprises making comparison holes. They are drilled simply and rapidly.

Preferably, the step (d) of making a plurality of comparing means on the die cutter support comprises making such means predominantly in peripheral areas of the wooden support. Interferences with the die cutter manufacturing process are thereby avoided as well as causing further deformations of the wooden support.

According to preferred implementations of the method, the step (e) of making the die cutter comprises the two following sub-steps:

making a plurality of notches on a surface of the wooden support;

inserting cutting rules and creasing rules within said cuts.

Such steps are in fact easy to carry out and cheap.

Preferably, the step (f) of detecting the position and/or orientation of the comparing means of the finished die cutter comprises detecting at least two coordinates, orthogonal to one another, of such means, with respect to a Cartesian reference system. Advantageously, such coordinates are the distances of the comparing means with respect to the Cartesian axes with origin in one of the corners of the die cutter support. Such a support in fact normally has a substantially rectangular base. Preferably the comparing means are punctiform, if not, their centre coordinates are used.

The step (f) of detecting the position and/or orientation of the comparing means of the finished die cutter, is preferably carried out by image capturing means, such as for example a camera, or object scanning means.

In accordance with preferred implementations of the invention, the step (g) of comparing the detected position and/or orientation with corresponding position and/or orientation of the comparing means being in the digital drawing of the die cutter and/or the step (h) of modifying the digital drawing of the counter-die cutter on the basis of the detected differences to adapt the digital drawing to the finished die cutter is/are carried out by conveniently software-controlled program means. In this way, the steps are particularly fast and accurate.

In particular, the Applicant found that by using known algorithms, such as for example the linear scaling algorithms, and by detecting the position offsets of the comparing means with respect to their ideal positions (i.e. those present on the digital drawing of the die cutter) on the horizontal axis ($\Delta x$) and on the vertical axis ($\Delta y$), a corrective factor can be obtained that, applied to the digital drawing of the counter-die cutter, produces a modified drawing. By such a modified drawing a counter-die cutter able to couple to the real die cutter is obtained, i.e. a counter-die cutter wherein the creasing channels coincide with the creasing rules of the respective die cutter.

Preferably, the step (i) of making the counter-die cutter on the basis of the modified digital drawing, is carried out by a milling cutter driven by an electronic control unit. In other words, the electronic control unit receives a modified drawing and drives the milling cutter according to the respective milling program.

The present invention also relates to a counter-die cutter made with the method of the present invention. It has the advantage of being perfectly consistent with the die cutter it cooperates with during the die cutting, complementarily as regard to the creasing rules.

The present invention further relates to a die cutter provided with comparing means. It has the advantage that it can be used in the afore described method with the subsequent respective benefits.

The second object of the present invention, i.e. to provide an adapting unit able to modify a milling program of a counter-die cutter on the basis of a digital drawing of a theoretical die cutter to adapt such drawing to a real die cutter, is achieved by a unit according to claim 12.

In particular, such an object is achieved by an adapting unit for a milling machine, which is adapted to make a counter-die cutter by program means programmed to mill a plate and based upon a digital drawing of the counter-die cutter, wherein said unit comprises:

- detecting means to detect the position and/or orientation of comparing means being on a finished die cutter intended to cooperate with a counter-die cutter to be made; and
- program means adapted to compare the detected position and/or orientation with corresponding position and/or orientation of comparing means being in a digital drawing of the die cutter and to modify the digital drawing of the counter-die cutter on the basis of the detected differences to adapt the digital drawing to the finished die cutter.

Such a unit, in addition to achieve the predetermined object, is simple, cheap and easily applicable to any milling machine of known type.

Preferably, the detecting means to detect the position and/or orientation of the comparison holes comprise image capturing means, such as a camera, or space scanning means. Such means are simple and accurate.

The present invention also relates to a milling machine comprising at least one adapting unit as described. Such a machine allows to estimate the real drawing of a die cutter in order to obtain a counter-die cutter consistent with the same, in short time and without wasters.

Preferably it also comprises a milling cutter driven by an electronic control unit.

For the purposes of the present invention, when talking of punctiform elements, elements with small size compared to a die cutter size are meant.

In the present context, with the term "metal plate", a plate in metal material or metal alloy is meant.

The Applicant has not yet been able to verify if the afore described solution can be applied to rotary die cutters, with the same advantages; however, we believe that also the counter-die cutter of a rotary die cutter can likely be made as described afore. Anyway, it is noted that the rotary counter-die cutters made of metal and milled are not common, meaning that they are little used; counter-die cutters coated with a flexible material are mostly used.

BRIEF LIST OF THE FIGURES

Further characteristics and advantages of the invention will be better evident by the review of the following specification of some preferred, but not exclusive, embodiments illustrated for illustration purposes only and without limitation, with the aid of the attached drawings, wherein.

DETAILED DESCRIPTION OF THE INVENTION

The following detailed description relates to a method of making a counter-die cutter, to an adapting unit for a milling machine intended for making counter-die cutters and to a milling machine comprising this unit.

The method of the present invention relates in particular to counter-die cutters made by milling a metal or metal alloy plate, which are adapted to cooperate with die cutters provided with a flat wooden support.

Figure 1:
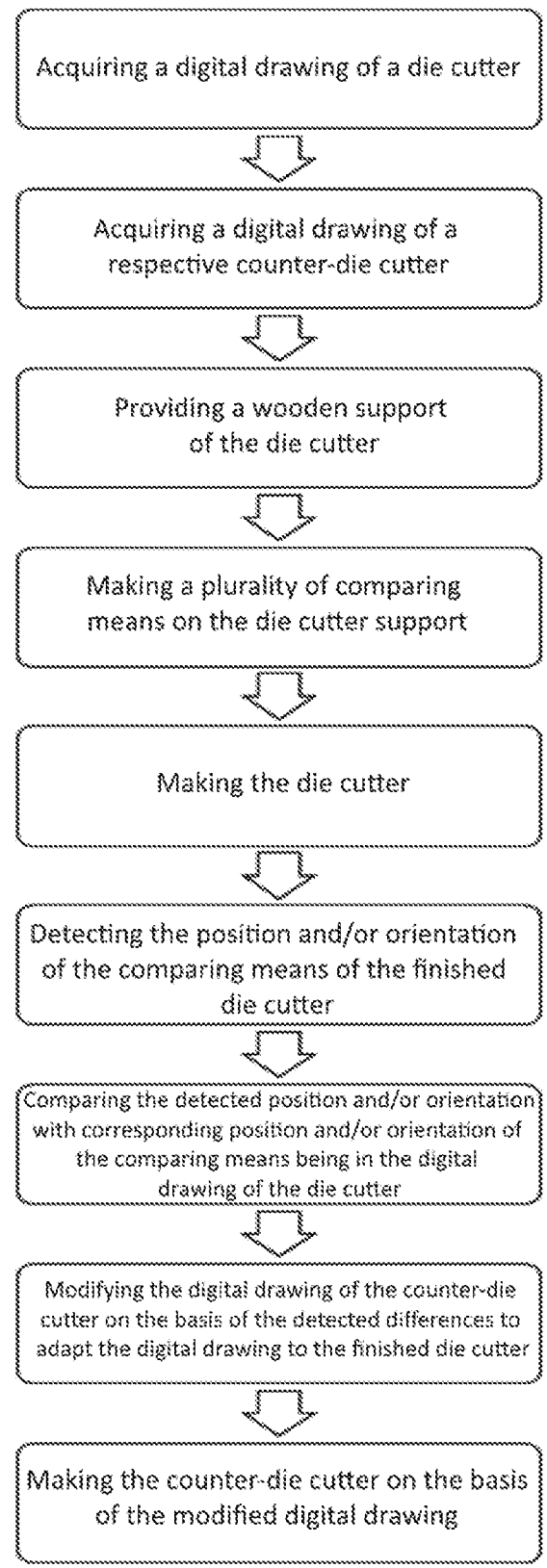
FIG. 1 shows a schematic block diagram of the method of the present invention.

In FIG. 1 all the steps of the method of the present invention are outlined.

Such a method, in accordance with the respective steps (a) and (b), provides the acquisition of digital drawings of a die cutter 1 and the corresponding counter-die cutter 2, both adapted to cooperate in a die-cutting machine. Such drawings are preferably CAD drawings.

Thus, the method provides the step of providing a wooden flat-type support 3 of the die cutter 1 (step (c)) and for drilling on its surface a plurality of comparing means (step (d)), according to the digital drawing.

In accordance with a preferred embodiment, the present invention provides for carrying out comparison holes 4 since they are simple to make, however equivalent comparing means can be provided, i.e. any concave, convex or flat reference with respect to the wooden support 3 that can serve to identify the point position of a small portion of the support 3. One could for example think of using small projecting elements or simply colored traces, for example drawn circles. Such comparing means are preferably punctiform.

Figure 3:
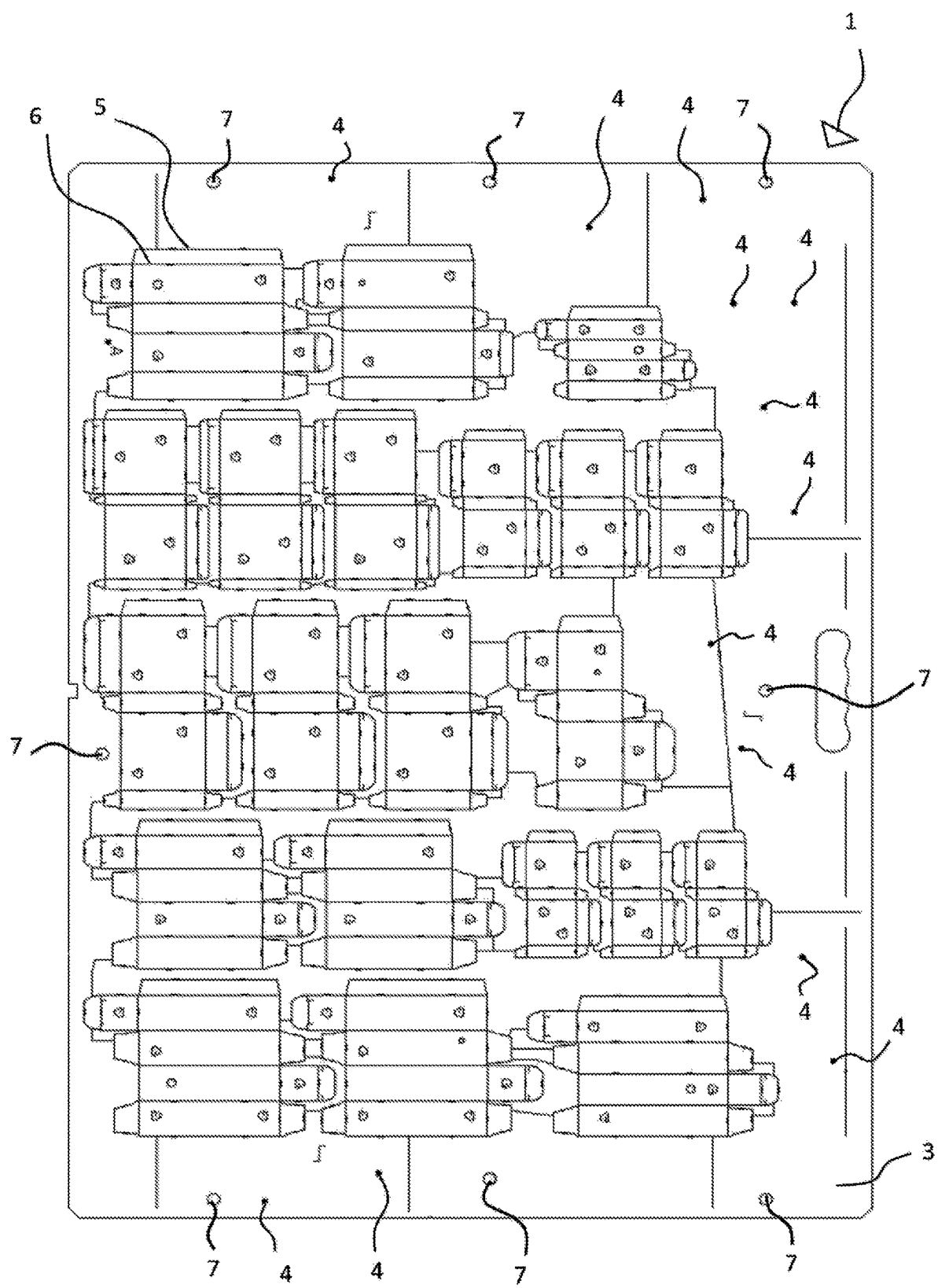
FIG. 3 shows a plan view of a die cutter during a step of the method of the present invention.

The comparison holes 4, or the equivalent comparing means, are preferably made in peripheral areas of the support 3, as visible in FIG. 3, so as to not interfere with the workings of the support 3.

Then the die cutter 1 is made, according to step (e), preferably by making a plurality of cuts on a surface of the wooden support 3, in which the cutting rules 5 and the creasing rules 6 are then inserted, according to digital drawing. Preferably the cuts are carried out by means of a $CO_2$ laser, as already known in the field.

In FIG. 3, that shows a die cutter 1 after the step (e), only one cutting rule 5 and only one creasing rule 6 are denoted with the respective reference numbers for the sake of clarity of the drawing, however, substantially all the substantially horizontal lines and the substantially vertical lines represent cutting rules 5 or creasing rules 6.

In FIG. 3 mounting holes 7 are then depicted, adapted for the mounting of the die cutter 1 on a die cutting machine, and further through holes of known type that could serve as air vents during the die cutting or as further mounting holes. These are usually made before making the cuts.

Following the afore mentioned operations, it is likely that the so-made die cutter 1 has undergone deformations, i.e. that its real shape is different from the digital drawing. For this reason, the method of the invention provides a step (f) of detecting the position and/or orientation of the comparison holes 4 of the finished die cutter 1.

In other words, once the manufacturing process of the die cutter 1 is ended, detecting means 13 to detect the position and/or orientation are used to detect the exact position of the comparison holes 4. For this purpose, at least two coordinates are detected, orthogonal to one another, of each of such comparison holes 4, with respect to a Cartesian reference system having origin in one of the four corners of the support 3, for simplicity reasons.

The detecting means 13 preferably comprise image capturing means, such as for example a camera, or space scanning means or photocells.

The Applicant found that detecting the position of the holes 4 is enough in the most frequent instances. For particular cases not yet experimented on the field, the orientation of the comparison holes 4 could also be determined, in order to obtain higher precision, a third spatial coordinate would be necessarily detected. Alternatively, the deformation of the comparison holes 4 detected in the image provided by the camera, or by equivalent means, could be studied, in order to deduce the orientation of the same. This is preferably carried out by special programmable means.

Then a step (g) is carried out that provides for comparing the camera detected position and/or orientation with corresponding position and/or orientation of the comparison holes 4 being in the digital drawing of the die cutter 1. Such a comparison is preferably carried out by programmable means 14, suitably programmed for this purpose.

In case of differences between the real comparison holes 4, i.e. the detected ones, and the ideal comparison holes 4, i.e. those being in the respective digital drawing, the method provides a following step (h) of modifying the digital drawing of the counter-die cutter 2 on the basis of the differences found so as to adapt the counter-die cutter 2 to the finished die cutter 1, i.e. to the real one. Such a step is also preferably carried out by programmable means 14 programmed for this purpose.

They are known programs exploiting equally known algorithms, such as for example the linear scaling algorithms.

Substantially such algorithms compare the detected coordinates of the comparison holes 4 with the ideal coordinates of the corresponding comparison holes 4, to obtain an error on each reference axis. If for example two coordinates x, y for the detected holes and x', y' for the ideal holes are detected, the algorithm will calculate an error $\Delta x$ ($=x-x'$) and an error $\Delta y$ ($=y-y'$) for each comparison hole 4. It will then calculate the arithmetic mean of all the errors in the x direction and the arithmetic mean of all the errors in the y direction, in order to obtain a corrective factor $\Phi$ having two coordinates ($\Phi_x$ and $\Phi_y$):

$$\Phi_x = \Sigma \Delta x_i/n \quad \Phi_y = \Delta y_i/n \quad (i=1,n),$$

wherein n is the number of the comparison holes 4.

The Applicant found that nonlinear algorithms can also be used, but such algorithms, much more complex than the linear algorithms, do not bring particular advantages.

Figure 2:
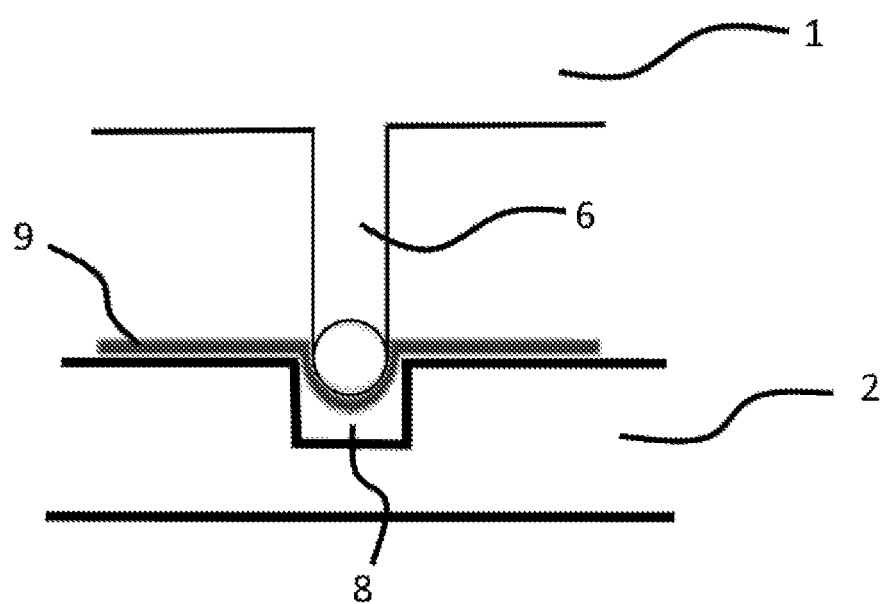
FIG. 2 shows a sectional view of a detail of a die cutter during the step of creasing a die cut blank.

Once the corrective factor $\Phi$ has been obtained, the programmable means 14 are adapted to apply such corrective factor to the digital drawing of the counter-die cutter 2 so as to obtain a modified drawing, i.e. conforming to the real die cutter 1. In other words, the creasing channels 8 are modified by a factor $\Phi_x$ in the x direction and by a factor $\Phi_y$ in the y direction. The Applicant found that, by doing so, a modified drawing of the counter-die cutter 2 can be obtained through which a counter-die cutter 2 is made that well couples with its die cutter 1, i.e. it is possible to achieve a mutual accurate positioning of the creasing rules 6 with the creasing channels 8, as shown in FIG. 2.

Such a figure shows a detail of a die cutting machine during a step of die cutting a material 9. From such a figure, it is noted how a good coupling between creasing rules 6 and creasing channels 8 is strictly needed in order to achieve an accurate and effective creasing line.

Where differences are absent between the detected and drawn holes, the algorithm will calculate null $\Delta x$ and $\Delta y$ and thus the corrective factor $\Phi$ will have coordinates (0,0), whereby the drawing will not be modified, i.e. the step (h) will not be carried out.

The last step of the method of the present invention, i.e. the step (i), comprises making the counter-die cutter 2 on the basis of the modified digital drawing. It is carried out by a milling cutter 15 driven by an electronic control unit 10. In other words, an electronic control unit 10 receives the digital drawing modified by the programmable means 14 and translates it in a milling program that, once applied to a plate, achieves making a counter-die cutter 2. Such an electronic control unit 10 can be integrated in the programmable means 14.

The present invention also relates to a counter-die cutter 2 made by the described method and a die cutter 1 provided with comparison means adapted to carry out this method.

In presence of an already finished die cutter 1 provided with comparing means, the method reduces to:

a. acquiring the digital drawing of the die cutter 1;

b. acquiring a digital drawing of a respective counter-die cutter 2 to be made;

f. detecting the position and/or orientation of the comparing means of the finished die cutter 1;

g. comparing the detected position and/or orientation with corresponding position and/or orientation of the comparing means being in the digital drawing of the die cutter 1;

h. modifying the digital drawing of the counter-die cutter 2 on the basis of the detected differences to adapt the digital drawing to the finished die cutter 1;

i. making the counter-die cutter 2 on the basis of the modified digital drawing.

In practice steps (c), (d) and (e) are omitted.

The steps of the method are not necessarily all consecutive. In fact, step (a) and step (b) can have a reversed order, i.e. it does not matter which digital drawing is acquired first. Furthermore, the succession of consecutive steps (c), (d) and (e), when present, can be carried out before steps (a) and (b), or between step (a) and step (b), without modifying the result. In other words, the die cutter 1 can be made and then the digital drawings can be acquired, otherwise a first digital drawing can be acquired, the die cutter 1 can be made and then the second digital drawing can be acquired.

Figure 4:
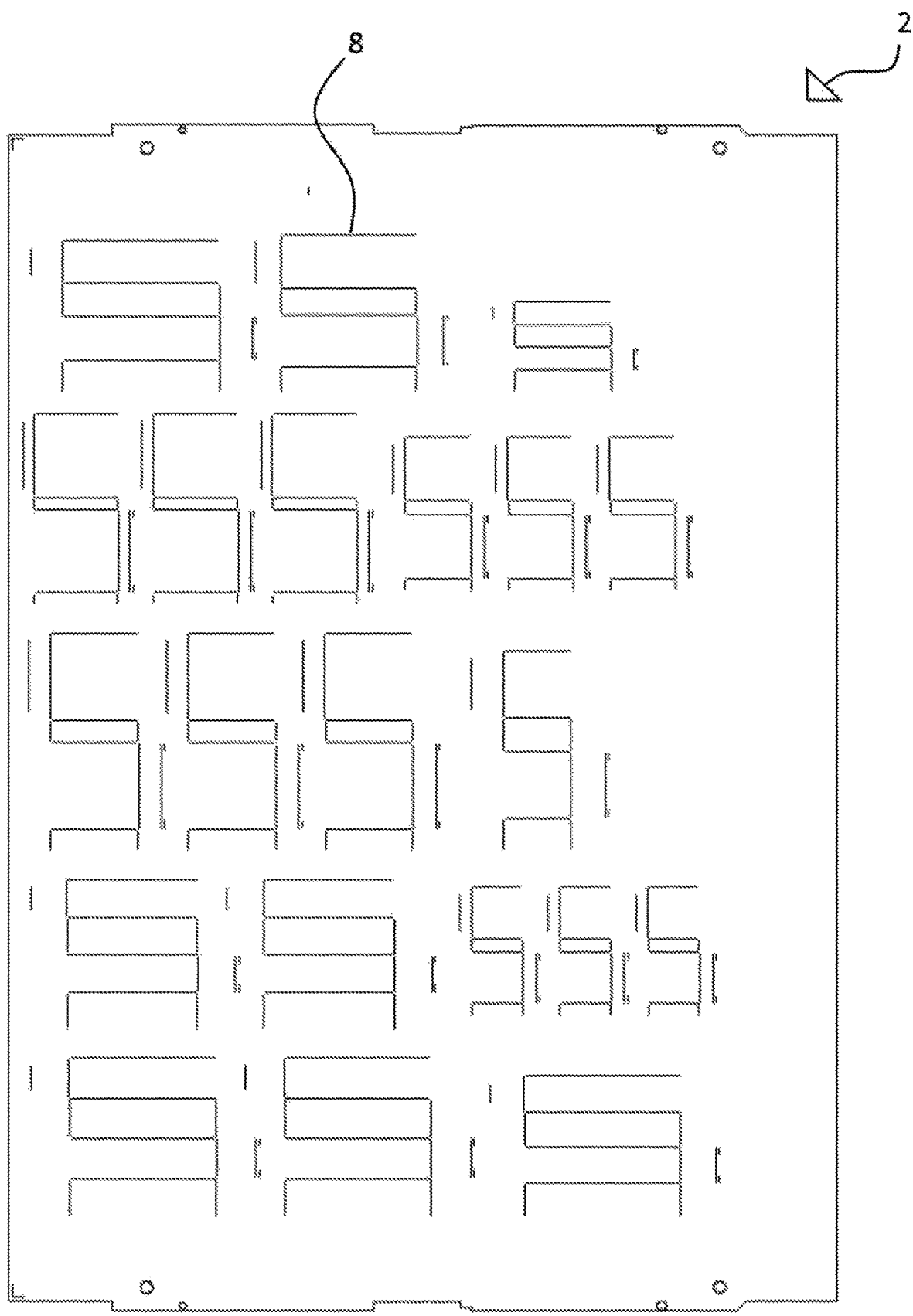
FIG. 4 shows a plan view of a counter-die cutter implemented by the method of the present invention.
Figure 5:
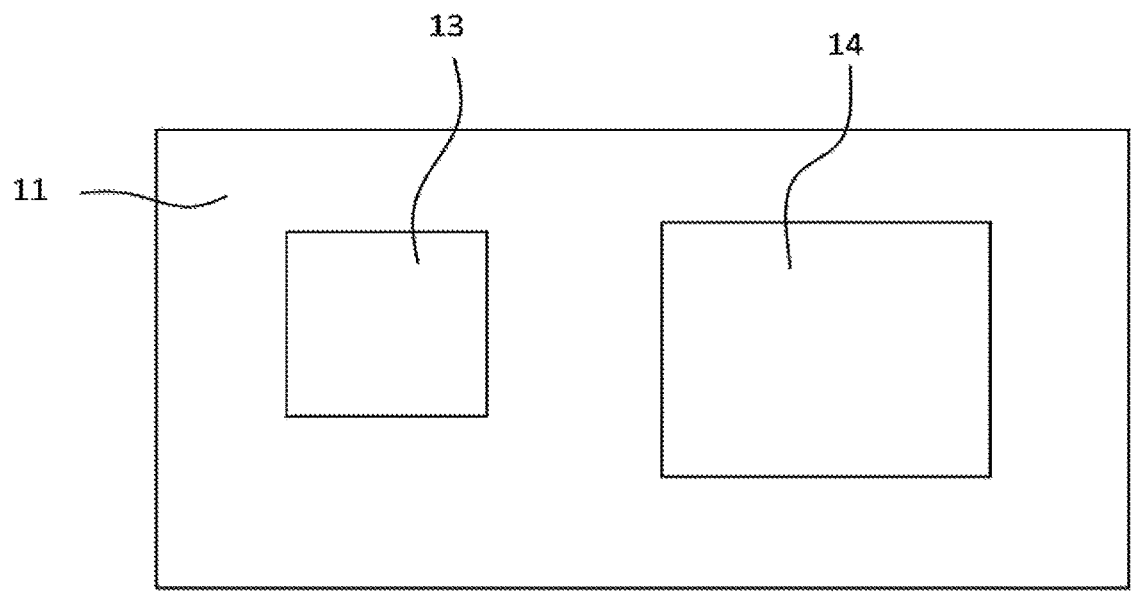
FIG. 5 shows a block scheme of an adapting unit according to the present invention.
Figure 6:
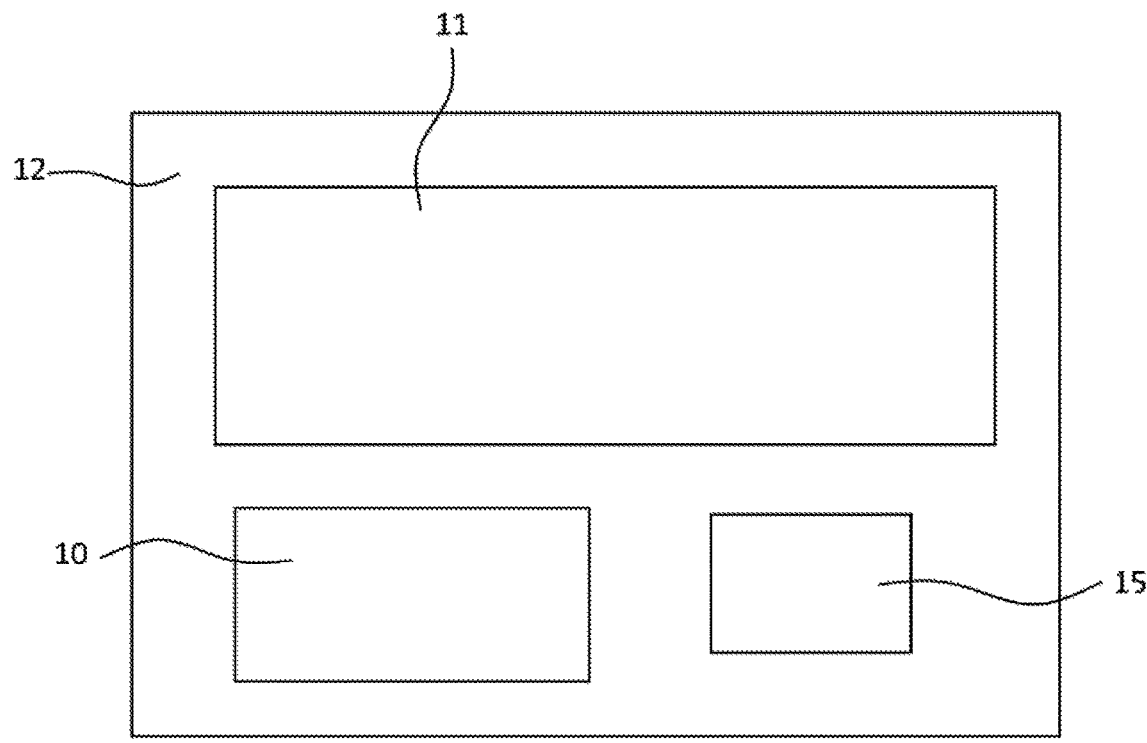
FIG. 6 shows a block scheme of a milling machine according to the present invention.

The finished counter-die cutter 2 can be seen in FIG. 4 where, for the sake of clarity of the image, only one reference number has been inserted related to a creasing channel 8, however, all the substantially horizontal and substantially vertical lines inside the counter-die cutter 2 represent creasing channels 8.

The present invention, in a second aspect thereof, relates to an adapting unit 11 for a milling machine 12 adapted to make a counter-die cutter 2 by programmable means 14 programmed to mill a plate, based on a digital drawing of the counter-die cutter 2. Said adapting unit 11 comprises:

detecting means 13 to detect the position and/or orientation of comparing means being on a finished die cutter 1 adapted to cooperate with the counter-die cutter 2 to be made;

programmable means 14 adapted to compare the detected position and/or orientation with corresponding position and/or orientation of comparing means being in a digital drawing of the die cutter 1 and to modify the digital drawing of the counter-die cutter 2 on the basis of the detected differences to adapt the digital drawing to the finished die cutter 1.

Preferably, the comparing means are comparison holes 4.

Preferably, the detecting means 13 to detect the position and/or orientation of the comparing means comprise image capturing means, such as a camera for example, or space scanning means or photocells.

The invention, in a further aspect thereof, relates to a milling machine 12 comprising at least one adapting unit as described above. The milling machine 12 further comprises at least one milling cutter 15 and an electronic control unit 10. The milling cutter 15, driven by the electronic control unit 10, removes material from a plate according to a milling program, so as to make a counter-die cutter 2 having the desired drawing. The electronic control unit 10 communicates with the programmable means 14 of the adapting unit 11, so that a counter-die cutter 2 precisely couplable with its corresponding die cutter 1 is obtained, for what explained above. The electronic control unit 10 can be integrated in the programmable means 14.

The milling machine 12 also comprises a working table accommodating the finished die cutter 1 in order to detect the position and/or orientation of the comparing means. Following the detecting operation, the die cutter 1 is removed from the working table that will therefore accommodate the plate during the working thereof.

In order to meet contingent and specific needs, the field technician could make further changes and variations to the method for implementing a counter-die cutter, to the adapting unit and the milling machine, as they have been described and claimed, without departing from the protection scope of the present invention.

For example, although the present invention is based on flat type supports of die cutters and counter-die cutters, one could consider using the same method for cylindrical type supports, by adding a spatial coordinate to detect the reference means position and making the obvious changes as needed. Therefore, the adapting unit and the milling machine could also be used for cylindrical supports, by making the obvious changes as needed, without departing from the protection scope of the present invention.

The invention claimed is:

1. A method of making a counter-die cutter (2) for a die cutting machine comprising a die cutter (1) and a respective counter-die cutter (2), the method comprising the steps of:
   a. acquiring a digital drawing of a die cutter (1) to be made, said die cutter (1) being provided with comparing means;
   b. acquiring a digital drawing of a respective counter-die cutter (2) to be made;
   c. providing a wooden support (3) of the die cutter (1);
   d. making a plurality of comparing means on the support (3) of the die cutter (1);
   e. making the die cutter (1);
   f. detecting the position and/or orientation of the comparing means of the finished die cutter (1);
   g. comparing the detected position and/or orientation with corresponding position and/or orientation of the comparing means being in the digital drawing of the die cutter (1);
   h. modifying the digital drawing of the counter-die cutter (2) on the basis of the detected differences to adapt the digital drawing to the finished die cutter (1); and
   i. making the counter-die cutter (2) on the basis of the modified digital drawing.

2. The method of making a counter-die cutter (2) according to claim 1, wherein the step (d) of making a plurality of comparing means on the support (3) of the die cutter (1), comprises making a plurality of comparison holes (4).

3. The method of making a counter-die cutter (2) according to claim 2, wherein the step (d) of making a plurality of comparing means on the support (3) of the die cutter (1), comprises making said plurality of comparing means generally in peripheral areas of the wooden support (3).

4. The method of making a counter-die cutter (2) according to claim 1, wherein the step (d) of making a plurality of comparing means on the support (3) of the die cutter (1), comprises making said plurality of comparing means generally in peripheral areas of the wooden support (3).

5. The method of making a counter-die cutter (2) according to one of claims 1, wherein the step (e) of making the die cutter (1) comprises the following two sub-steps:
   making a plurality of cuts on a surface of the wooden support (3);
   inserting cutting rules (5) and creasing rules (6) inside said cuts.

6. The method of making a counter-die cutter (2) according to claim 1, wherein the step (f) of detecting the position and/or orientation of the comparing means of the finished die cutter (1) comprises detecting at least two coordinates, orthogonal to one another, of these means, with respect to a Cartesian reference system.

7. The method of making a counter-die cutter (2) according to claim 1, wherein the step (f) of detecting the position and/or orientation of the comparing means of the finished die cutter (1) is carried out by image capturing means or space scanning means.

8. The method of making a counter-die cutter (2) according to claim 1, wherein the step (g) of comparing the detected position and/or orientation with corresponding position and/or orientation of the comparing means being in the digital drawing of the die cutter (1) and/or the step of modifying the digital drawing of the counter-die cutter (2) on the basis of the detected differences to adapt the digital drawing to the finished die cutter (1) is/are carried out by conveniently-programmed programmable means (14).

9. The method of making a counter-die cutter (2) according to claim 8, wherein said programmable means (14) comprise a linear scaling algorithm.

10. The method of making a counter-die cutter (2) according to claim 1, wherein the step (i) of making the counter-die cutter (2) on the basis of the modified digital drawing, is carried out by a milling cutter (15) driven by an electronic control unit (10).

11. A counter-die cutter (2) made by the method according to claim 1.

12. A die cutter (1) comprising comparing means configured to carry out the method according claim 1.

13. A method of making a counter-die cutter (2) for a die cutting machine, comprising a die cutter (1) and a respective counter-die cutter (2), the die cutter (1) being provided with a wooden support (3) and comparing means, the method comprising the steps of:
- a. acquiring a digital drawing of the die cutter (1);
- b. acquiring a digital drawing of a respective counter-die cutter (2) to be made;
- f. detecting the position and/or orientation of the comparing means of the finished die cutter (1);
- g. comparing the detected position and/or orientation with corresponding position and/or orientation of the comparing means being in the digital drawing of the die cutter (1);
- h. modifying the digital drawing of the counter-die cutter (2) on the basis of the detected differences to adapt the digital drawing to the finished die cutter (1); and
- i. making the counter-die cutter (2) on the basis of the modified digital drawing.

\* \* \* \* \*